(12) United States Patent
Liu et al.

(10) Patent No.: US 12,090,811 B2
(45) Date of Patent: Sep. 17, 2024

(54) ROOF TOP AIR CONDITIONER UNIT, METHODS FOR PRODUCING, ASSEMBLING AND INSTALLING THE ROOF TOP AIR CONDITIONER UNIT AND VEHICLE WITH THE ROOF TOP AIR CONDITIONER UNIT

(71) Applicant: Dometic Sweden AB, Solna (SE)

(72) Inventors: Louis Liu, JinWan (CN); Jianmin Chen, JinWan (CN)

(73) Assignee: Dometic Sweden AB, Solna (SE)

( * ) Notice: Subject to any disclaimer, the term of this patent is extended or adjusted under 35 U.S.C. 154(b) by 0 days.

(21) Appl. No.: 18/158,786

(22) Filed: Jan. 24, 2023

(65) Prior Publication Data

US 2023/0166576 A1 Jun. 1, 2023

Related U.S. Application Data

(63) Continuation of application No. 16/722,938, filed on Dec. 20, 2019, now Pat. No. 11,571,945.

(30) Foreign Application Priority Data

Dec. 21, 2018 (DE) .......................... 102018222877.9

(51) Int. Cl.
*B60H 1/00* (2006.01)

(52) U.S. Cl.
CPC ..... *B60H 1/00364* (2013.01); *B60H 1/00535* (2013.01); *B60H 1/00542* (2013.01); *B60H 2001/00235* (2013.01)

(58) Field of Classification Search
CPC ............ B60H 1/00364; B60H 1/00535; B60H 1/00542; B60H 2001/00235
See application file for complete search history.

(56) References Cited

U.S. PATENT DOCUMENTS

| 226,450 | A | * | 4/1880 | Ibbotson | ................. F16B 39/30 |
| | | | | | 411/308 |
| D226,381 | S | | 2/1973 | Harty, Jr. | |
| D284,025 | S | | 5/1986 | Armstrong | |
| 4,641,502 | A | | 2/1987 | Aldrich | |
| 4,672,818 | A | | 6/1987 | Roth | |

(Continued)

FOREIGN PATENT DOCUMENTS

| AU | 2004202967 | 3/2011 |
| AU | 2007200788 | 9/2011 |

(Continued)

OTHER PUBLICATIONS

WO-2016030203-A1 Translation (Year: 2016).*

(Continued)

*Primary Examiner* — David J Teitelbaum
(74) *Attorney, Agent, or Firm* — Dinsmore & Shohl LLP

(57) ABSTRACT

A roof top air conditioner unit for a vehicle, in particular a recreational vehicle, wherein the roof top air conditioner at least in part is made of expanded polypropylene (EPP). At least one stabilizing and/or connecting element of the roof top air conditioner unit is mold in the section of the roof top air conditioner unit made of EPP. Furthermore, the present invention refers to a method for producing, assembling and installing such roof top air conditioner units and a vehicle having such a roof top air conditioner assembly.

9 Claims, 2 Drawing Sheets

(56) References Cited

U.S. PATENT DOCUMENTS

| | | | |
|---|---|---|---|
| 4,709,623 A | 12/1987 | Roth | |
| D300,777 S | 4/1989 | Bales | |
| D306,341 S | 2/1990 | Bales | |
| 5,531,641 A | 7/1996 | Aldrich | |
| 5,848,536 A | 12/1998 | Dodge | |
| 6,213,197 B1 | 4/2001 | Ebbeson | |
| 6,226,999 B1* | 5/2001 | Suda | B60H 1/3227 62/298 |
| 6,263,689 B1 | 7/2001 | Dodge | |
| 6,449,973 B2 | 9/2002 | Dodge | |
| 6,857,953 B2 | 2/2005 | Malott | |
| 7,140,192 B2 | 11/2006 | Allen | |
| 7,171,822 B2 | 2/2007 | Allen | |
| 7,234,315 B2 | 6/2007 | Allen | |
| 7,237,397 B2 | 7/2007 | Allen | |
| 7,316,119 B2 | 1/2008 | Allen | |
| 7,419,368 B2 | 9/2008 | Milks | |
| D588,479 S | 3/2009 | Giese | |
| 7,739,882 B2 | 6/2010 | Evans | |
| 7,798,687 B2* | 9/2010 | Lin | B60Q 1/2623 362/508 |
| 7,963,117 B2 | 6/2011 | Allen | |
| 8,056,351 B2 | 11/2011 | Marciano | |
| D661,386 S | 6/2012 | Bergin | |
| 8,240,168 B2 | 8/2012 | Holguin | |
| 8,440,143 B2 | 5/2013 | Liptak | |
| 8,535,127 B2 | 9/2013 | Malott | |
| 8,568,209 B2 | 10/2013 | Boxum | |
| D712,531 S | 9/2014 | Bergin | |
| D715,907 S | 10/2014 | Bergin | |
| D716,925 S | 11/2014 | Bergin | |
| 9,631,832 B2 | 4/2017 | Malott | |
| D785,771 S | 5/2017 | Bergin | |
| D785,772 S | 5/2017 | Bergin | |
| 9,651,284 B2 | 5/2017 | Esch | |
| D795,712 S | 8/2017 | Bergin | |
| D811,566 S | 2/2018 | Liu | |
| D817,466 S | 5/2018 | Moseley | |
| 9,975,405 B2 | 5/2018 | Siddiqui | |
| D824,499 S | 7/2018 | Williamson | |
| 10,082,345 B1 | 9/2018 | Mihail | |
| 10,093,152 B2 | 10/2018 | Allard | |
| D841,138 S | 2/2019 | Williamson | |
| D850,609 S | 6/2019 | Bergin | |
| D862,668 S | 10/2019 | Moseley | |
| D865,926 S | 11/2019 | Moseley | |
| 10,589,593 B2 | 3/2020 | Westendarp | |
| D884,870 S | 5/2020 | Bergin | |
| 10,675,941 B2 | 6/2020 | Williamson | |
| 10,696,129 B2 | 6/2020 | Bergin | |
| D905,217 S | 8/2020 | Hederstiema | |
| 11,571,945 B2 | 2/2023 | Liu | |
| 2006/0052050 A1 | 3/2006 | Malott | |
| 2007/0227693 A1 | 10/2007 | Allen | |
| 2008/0202138 A1 | 8/2008 | Pabisz | |
| 2009/0209193 A1 | 8/2009 | Kloster | |
| 2010/0006257 A1 | 1/2010 | Schutz | |
| 2013/0205811 A1 | 8/2013 | Esch | |
| 2014/0223928 A1 | 8/2014 | Esch | |
| 2019/0047354 A1 | 2/2019 | Williamson | |
| 2019/0128551 A1 | 5/2019 | Heral | |
| 2019/0315197 A1 | 10/2019 | Williamson | |
| 2020/0148028 A1 | 5/2020 | Westendarp | |
| 2020/0198438 A1 | 6/2020 | Liu | |
| 2020/0298655 A1 | 9/2020 | Williamson | |
| 2020/0338951 A1 | 10/2020 | Paci | |

FOREIGN PATENT DOCUMENTS

| | | |
|---|---|---|
| AU | 2007237183 | 12/2012 |
| AU | 2009233601 | 1/2013 |
| AU | 2007202766 | 11/2013 |
| AU | 354553 | 3/2014 |
| AU | 2012261549 | 8/2015 |
| AU | 367405 | 3/2016 |
| AU | 201612249 | 3/2016 |
| AU | 201613590 | 7/2016 |
| AU | 201613591 | 7/2016 |
| AU | 201613592 | 7/2016 |
| AU | 201613593 | 7/2016 |
| AU | 2016101949 | 12/2016 |
| AU | 2017100215 | 3/2017 |
| AU | 201712794 | 5/2017 |
| AU | 201712798 | 5/2017 |
| AU | 2017200186 | 8/2017 |
| AU | 201810968 | 3/2018 |
| AU | 201810969 | 3/2018 |
| AU | 201810970 | 3/2018 |
| AU | 201810971 | 3/2018 |
| AU | 201810972 | 3/2018 |
| AU | 201810973 | 3/2018 |
| AU | 201810975 | 3/2018 |
| AU | 201810977 | 3/2018 |
| AU | 201810978 | 3/2018 |
| AU | 201816419 | 1/2019 |
| AU | 201910037 | 2/2019 |
| AU | 201910038 | 2/2019 |
| AU | 201911094 | 4/2019 |
| AU | 201912125 | 6/2019 |
| AU | 2017364256 | 6/2019 |
| AU | 2019202512 | 10/2019 |
| AU | 201915241 | 12/2019 |
| AU | 201916406 | 12/2019 |
| AU | 201916408 | 12/2019 |
| AU | 201916409 | 12/2019 |
| AU | 2018366469 | 5/2020 |
| CA | 2518348 | 3/2006 |
| CA | 2578651 | 8/2007 |
| CA | 2587994 | 12/2007 |
| CA | 2611822 | 5/2008 |
| CA | 2686403 | 5/2010 |
| CA | 2906348 | 9/2014 |
| CA | 2951956 | 12/2015 |
| CA | 2954152 | 1/2016 |
| CA | 165232 S | 5/2016 |
| CA | 165233 S | 5/2016 |
| CA | 167431 S | 2/2017 |
| CA | 172872 S | 2/2017 |
| CA | 172873 S | 2/2017 |
| CA | 172874 S | 2/2017 |
| CN | 103237671 A | 8/2013 |
| CN | 103687735 A | 3/2014 |
| CN | 106470856 A | 3/2017 |
| CN | 304097003 S | 4/2017 |
| CN | 106976376 A | 7/2017 |
| CN | 109070688 A | 12/2018 |
| CN | 305029216 S | 2/2019 |
| CN | 305029217 S | 2/2019 |
| CN | 305029218 S | 2/2019 |
| CN | 305105066 S | 4/2019 |
| CN | 110293813 A | 10/2019 |
| CN | 110385958 A | 10/2019 |
| CN | 305397384 S | 10/2019 |
| CN | 111344168 A | 6/2020 |
| DE | 4421094 A1 | 12/1995 |
| DE | 19654261 | 6/1998 |
| DE | 69503723 | 9/1998 |
| DE | 19730136 | 1/1999 |
| DE | 19733771 C1 | 6/1999 |
| DE | 19937000 A1 | 2/2001 |
| DE | 10020086 A1 | 10/2001 |
| DE | 10215823 A1 | 10/2003 |
| DE | 69817899 | 10/2003 |
| DE | 10255833 | 6/2004 |
| DE | 10336767 | 12/2004 |
| DE | 59812376 | 1/2005 |
| DE | 202004007924 | 11/2005 |
| DE | 202005013530 | 12/2005 |
| DE | 202004017266 | 4/2006 |
| DE | 202005000560 | 6/2006 |
| DE | 102005030362 | 11/2006 |
| DE | 602004004480 | 3/2007 |
| DE | 202006001374 | 7/2007 |

(56) References Cited

FOREIGN PATENT DOCUMENTS

| | | | |
|---|---|---|---|
| DE | 202006001376 | | 7/2007 |
| DE | 202006001377 | | 7/2007 |
| DE | 202006009803 | | 12/2007 |
| DE | 102006047369 | A1 | 4/2008 |
| DE | 202007006292 | | 10/2008 |
| DE | 102007038716 | | 2/2009 |
| DE | 602005012194 | | 2/2009 |
| DE | 202008003123 | | 9/2009 |
| DE | 102008028066 | | 12/2009 |
| DE | 602007009584 | | 11/2010 |
| DE | 502007006725 | | 4/2011 |
| DE | 202011101256 | | 12/2011 |
| DE | 202010012578 | | 2/2012 |
| DE | 102011103359 | A1 | 11/2012 |
| DE | 102012018272 | A1 * | 3/2014 ......... B60H 1/00371 |
| DE | 102012216039 | A1 | 5/2014 |
| DE | 202011002986 | | 7/2014 |
| DE | 202013004158 | | 9/2014 |
| DE | 102014217170 | A1 | 3/2016 |
| DE | 102016220768 | | 4/2018 |
| DE | 112017000915 | | 10/2018 |
| DE | 102017214941 | | 2/2019 |
| DE | 102017207797 | | 8/2019 |
| DE | 112017005541 | | 8/2019 |
| DE | 102018204532 | | 9/2019 |
| DE | 102018206490 | | 10/2019 |
| DE | 102019205194 | | 10/2019 |
| DE | 102017219353 | | 11/2019 |
| DE | 102018206854 | | 11/2019 |
| DE | 112018003284 | | 3/2020 |
| DE | 202015009786 | | 3/2020 |
| DE | 212018000248 | | 3/2020 |
| DE | 212018000249 | | 3/2020 |
| DE | 112018003288 | | 4/2020 |
| DE | 102018222877 | | 6/2020 |
| DE | 102018222877 | A1 | 6/2020 |
| DE | 112018005002 | | 7/2020 |
| DE | 112018005883 | | 7/2020 |
| EP | 700801 | | 3/1996 |
| EP | 869018 | | 10/1998 |
| EP | 892225 | | 1/1999 |
| EP | 1538009 | | 6/2005 |
| EP | 1634740 | | 3/2006 |
| EP | 1721765 | | 11/2006 |
| EP | 1752717 | | 2/2007 |
| EP | 1826041 | | 8/2007 |
| EP | 1870270 | | 12/2007 |
| EP | 1925889 | | 5/2008 |
| EP | 1955946 | | 8/2008 |
| EP | 1988612 | | 11/2008 |
| EP | 2189312 | | 5/2010 |
| EP | 2192040 | | 6/2010 |
| EP | 2196390 | | 6/2010 |
| EP | 2 061 666 | B1 | 9/2010 |
| EP | 2433658 | | 3/2012 |
| EP | 2665611 | | 10/2014 |
| EP | 2178710 | | 11/2015 |
| EP | 2616258 | | 2/2016 |
| EP | 3113965 | | 1/2017 |
| EP | 3241695 | | 4/2018 |
| EP | 2714440 | | 5/2018 |
| EP | 2994326 | | 7/2018 |
| EP | 3401619 | | 11/2018 |
| EP | 3411250 | | 12/2018 |
| EP | 3476630 | | 5/2019 |
| EP | 3543047 | | 9/2019 |
| EP | 3564564 | | 11/2019 |
| WO | 2006128522 | A1 | 12/2006 |
| WO | 2009021994 | A1 | 2/2009 |
| WO | 2012034695 | A1 | 3/2012 |
| WO | 2012113538 | A1 | 8/2012 |
| WO | 2012159749 | A1 | 11/2012 |
| WO | 2014143181 | A1 | 9/2014 |
| WO | 2014180559 | A1 | 11/2014 |
| WO | WO-2016030203 | A1 * | 3/2016 ......... B60H 1/00371 |
| WO | 2017143393 | A1 | 8/2017 |
| WO | 2017143394 | A1 | 8/2017 |
| WO | 2018096127 | A1 | 5/2018 |
| WO | 2019038023 | A1 | 2/2019 |
| WO | 2019082168 | A1 | 5/2019 |
| WO | 2019097448 | A1 | 5/2019 |
| WO | 2019207451 | A2 | 10/2019 |
| WO | 2019229706 | A1 | 12/2019 |
| WO | 2019244011 | A1 | 12/2019 |
| WO | 2020143636 | A1 | 7/2020 |
| WO | 2020151541 | A1 | 7/2020 |
| WO | 2020188485 | A2 | 9/2020 |
| WO | 2020192746 | A1 | 10/2020 |

OTHER PUBLICATIONS

DE-102012018272-A1 Translation (Year: 2014).*
Office Action Opposition for Germany Patent Application No. 102018222877.9 mailed on Jul. 8, 2021.
Decision to Grant Issued in German Patent Application No. 102018222877.9 mailed on Jun. 24, 2020.
Office Action for Germany Patent Application No. 102018222877.9 mailed on Nov. 29, 2019.
DE Application No. 102018222877.9 filed on Dec. 21, 2018 entitled "Roof Top Air Conditioner Unit, Methods for Producing, Assembling and Installing the Roof Top Air Conditioner Unit and Vehicle with the Roof Top Air Conditioner Unit".
U.S. Appl. No. 16/722,938, filed Dec. 20, 2019 entitled "Roof Top Air Conditioner Unit, Methods for Producing, Assembling and Installing the Roof Top Air Conditioner Unit and Vehicle with the Roof Top Air Conditioner Unit".
Restriction Requirement Issued in U.S. Appl. No. 16/722,938 mailed on Dec. 6, 2021.
Non Final Office Action Issued in U.S. Appl. No. 16/722,938 mailed on Feb. 16, 2022.
Notice of Allowance Issued in U.S. Appl. No. 16/722,938 mailed on Sep. 6, 2022.
Corrected Notice of Allowance Issued in U.S. Appl. No. 16/722,938 mailed on Dec. 23, 2022.
U.S. Appl. No. 16/384,376, filed Apr. 15, 2019 titled Air Distribution Apparatus.
U.S. Appl. No. 17/003,309, filed Aug. 26, 2020 titled Component of Climatization System or Window System.
U.S. Appl. No. 17/003,310, filed Aug. 26, 2020 titled Air Conditioning Unit.
U.S. Appl. No. 17/003,317, filed Aug. 26, 2020 titled Climatization and Window System for Mobile Homes.
U.S. Appl. No. 17/049,731, filed Oct. 22, 2020 titled Damped Mobile Compressor.
Design U.S. Appl. No. 29/594,476, filed Feb. 17, 2017 titled Shroud Assembly.
Design U.S. Appl. No. 29/604,433, filed May 17, 2017 titled Air Conditioning Apparatus.
Design U.S. Appl. No. 29/645,887, filed Apr. 30, 2018 titled Mobile Air Conditioner.
Design U.S. Appl. No. 29/660,094, filed Aug. 17, 2018 titled Air Distribution Box.
Design U.S. Appl. No. 29/715,592, filed Dec. 3, 2019 titled Filter Housing.
Design U.S. Appl. No. 29/758,314, filed Nov. 13, 2020 titled Air Conditioning Apparatus.
Dometic Product Catalog—Climate Control. 2015.
Dometic Product Catalog—Climate Control. 2016.
10-Minute Tech, Trailer Life, Jul. 1996, pp. 69-70 dated Jul. 1, 1996.
American RV Company, Dometic 459530 Duo Therm 13,500 BTU Brisk Air Conditioner High Efficiency Upper Unit Trailer Camper RV, Mar. 23, 2014, https://web.archive.org/web/20140323013456/ http://www.americanrvcompany.com/Dometic-459530-Duo-Therm-13500-BTU-Brisk-Air-Conditioner-High-Efficiency-Upper-Unit-Trailer-Camper-RV Mar. 23, 2014.
American RV Company, Dometic 541815 High Performance 13,500 BTU Air Conditioner Upper Unit CCC2 Required Electronics Pre-Installed Camper Trailer RV, https://web.archive.org/web/

(56) References Cited

OTHER PUBLICATIONS

20140323014940/http://www.americanrvcompany.com/Dometic-541815-High-Performance-13500-BTU-Air-Conditioner-Upper-Unit-CCC2-Required-Electronics-Pre-Installed-Camper-Trailer-RV Mar. 23, 2014.

American RV Company, Dometic 541916 High Performance 15,000 BTU Air Conditioner Upper Unit Single Zone LCD Thermostat Required Electronics Pre-Installed Camper Trailer RV, https://web.archive.org/web/20140323014952/http://www.americanrvcompany.com/Dometic-541916-High-Performance-15000-BTU-Air-Conditioner-Upper-Unit-Single-Zone-LCD-Thermostat-Required-Electronics-Pre-Installed-Camper-Trailer-RV Mar. 23, 2014.

American RV Company, Dometic 551816 High Performance 15,000 BTU Heat Pump for Comfort Control Center II Camper Trailer RV, http://www.americanrvcompany.com/Dometic-551816-High-Performance-15000-BTU-Heat-Pump-for-Comfort-Control-Center-II-Camper-Trailer-RV Apr. 15, 2012.

American RV Company, Dometic 541816 High Performance 15,000 BTU Air Conditioner Upper Unit CCC2 Required Electronics Pre-Installed Camper Trailer RV, http://www.americanrvcompany.com/Dometic-541816-High-Performance-15000-BTU-Air-Conditioner-Upper-Unit-CCC2-Required-Electronics-Pre-Installed-Camper-Trailer-RV Mar. 23, 2014.

Dirna Bergstrom: Slim Cool; http://www.dirna.com/files/dirna-manuals/220RE00183.pdf May 21, 2014.

Dometic Corporation, Dometic High Performance Air Conditioners, 2 pages, Jan. 1, 2011.

Dometic Duo-Therm, p. 140, Feb. 23, 2013.

Dometic Group: "Climate Control", http://www.dometic.com/enus/Americas/USA/RV-Products/climate, 2 pages.

Dometic Waeco Coolair RT 880; http://vvww.dometic.co.uk/product/waeco-coolair-rt-880-2/ May 14, 2015.

Eberspacher Cooltronic Parking Coolers with High Efficiency with the Engine OFF; http://www.eberspacher.com/products/air-conditioning/cooltronic-truck-parking-coolers.html Jun. 23, 2015.

Indelb; WO Oblo; Sleeping Well Oblo; http://www.indelb.com/products/parking_air_cooler/sleeping_well/sw_oblo Apr. 1, 2016.

Webasto: Rooftop air conditioning systems: Rooftop 3.5-9.9 kw; https://web.archive.org/web/20161201014045/https://www.webasto.com/au/markets-products/off-highway/air-conditioning/rooftop-air-conditioning/rooftop-ac-35-99-kw/.

Webasto; Truck parking cooler: Cool Top Vario 10 E; http://www.webasto.com/gb/marketsproducts/truck/air-conditioning/products/cool-top-vario/ Apr. 25, 2016.

Youtube; Viesa Kompressor; https://www.youtube.com/watch?v=SPK17XEvVLO May 22, 2012 (https://www.google.com/?gws_rd=ssl#q=https://www.youtube.com/watch?v%3DSPK17XEvVL0&spf=1495819902591).

Dirna Bergstrom: Parking Coolers—No-Idle Electrical A/C—MiniCool Compact 1.4; http://www.dirna.com/parking-coolers-no-idle-electrical-ac-compact/ Mar. 17, 2015.

\* cited by examiner

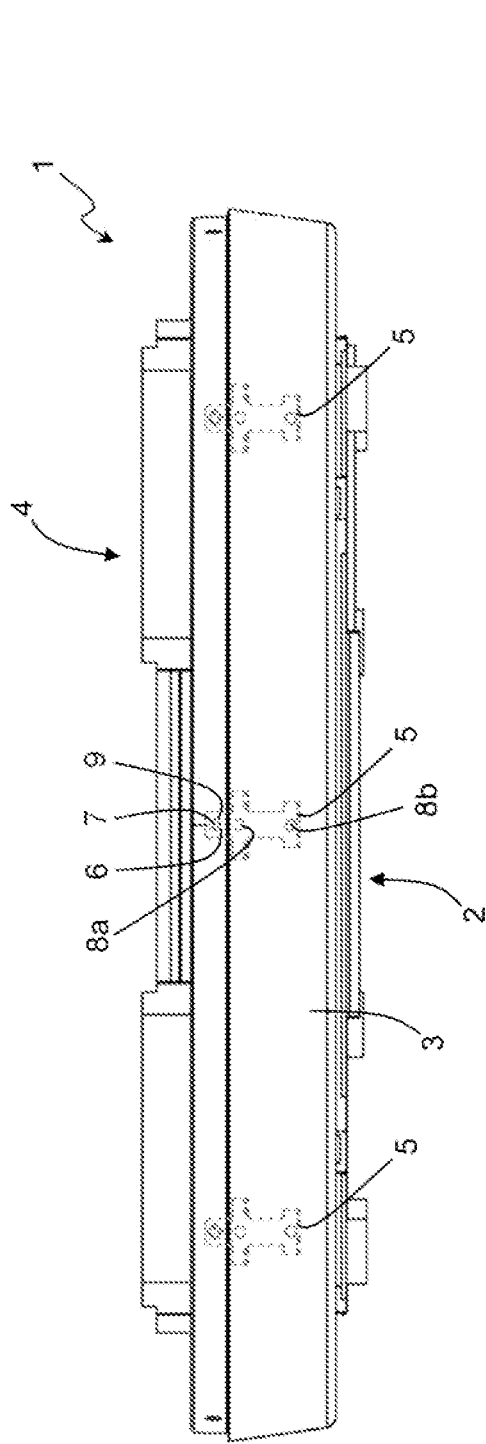
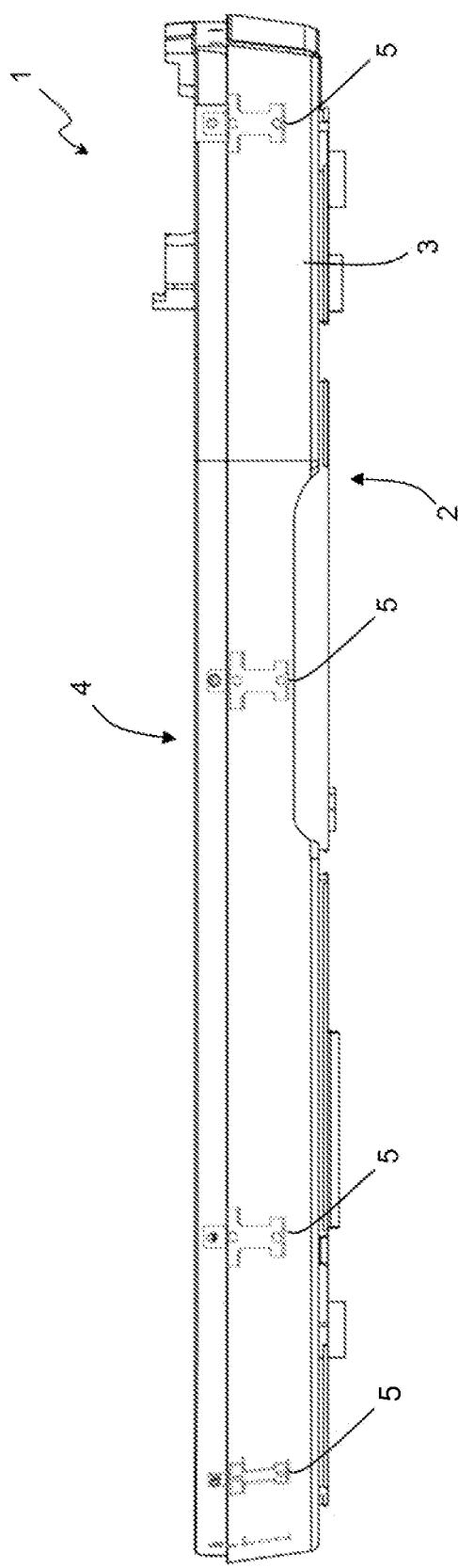

ROOF TOP AIR CONDITIONER UNIT, METHODS FOR PRODUCING, ASSEMBLING AND INSTALLING THE ROOF TOP AIR CONDITIONER UNIT AND VEHICLE WITH THE ROOF TOP AIR CONDITIONER UNIT

CLAIM TO PRIORITY

This continuation patent application claims priority to and benefit of, under 35 U.S.C. § 120, U.S. patent application Ser. No. 16/722,938, filed Dec. 20, 2019, which claims priority to German patent application DE 102018222877.9, filed Dec. 21, 2018, all of which is incorporated by reference herein.

BACKGROUND

1. Field of the Invention

The present embodiments refer to a roof top air conditioner unit, methods for producing, assembling and/or installing the roof top air conditioner unit and a vehicle comprising the roof top air conditioner unit.

2. Description of the Related Art

For roof top air conditioner units provided for vehicles, and in particular provided for recreational vehicles like caravans or campers, high requirements with regard to stability and reduced weight have to be met. At the same time a reliable and quite resistant overall configuration of the roof top air conditioner unit and of its coupling to the vehicle has to be ensured.

In the past various different attempts to solve the above problem have been made. However, although known roof top air conditioner units work quite well in this regard there is still room for enhancements for a roof top air conditioner unit in order to solve all the above problems in a satisfactory manner at once.

Accordingly, the problem to be solved by the present embodiments provides a roof top air conditioner unit as well as corresponding methods for production, assembling and/or installing the roof top air conditioner unit as well as a vehicle equipped with the roof top air conditioner unit overcoming all the above problems at once.

SUMMARY

The present application discloses one or more of the features recited in the appended claims and/or the following features which alone or in any combination, may comprise patentable subject matter.

According to the present embodiments, a roof top air conditioner unit for a vehicle, in particular for a recreational vehicle, is made at least in part of expanded polypropylene (EPP), wherein the roof top air conditioner unit has at least one stabilizing and/or connecting element mold in the section of the roof top air conditioner unit made of EPP.

Due to the favorable material properties of EPP providing the roof top air conditioner unit made at least in part of EPP results in a light weight and robust configuration. The stabilizing elements are further stabilizing the structure of corresponding sections of the roof top air conditioner unit and improve the overall stability of the roof top air conditioner unit. The connection elements, moreover, provide a reliable solution to couple the corresponding section of the roof top conditioner unit to other sections or elements of the roof top air conditioner unit or to the vehicle. As the stabilizing and/or connection elements are directly mold into the EEP, a reliable connection between the stabilizing and/or connection elements and the corresponding section of the roof top air conditioner unit is realized. In particular, the stabilizing and/or connection elements are configured to both stabilize the overall construction of the roof top air conditioner unit and to connect various sections or elements of the roof top air conditioner unit to each other and to connect the roof top air conditioner unit to the vehicle.

According to some embodiments of the roof top air conditioner, there is at least one housing and/or one base pan at least in part, but optionally completely made of EPP.

The housing and/or the base pan of the roof top air conditioner unit are the largest parts thereof, which is why providing these parts substantially made of EPP results in a high reduction in weight of the overall roof top air conditioner unit.

According to a further embodiment, the at least one stabilizing and/or connecting element is a nut configured to be engaged with a corresponding fastening means for assembling and/or installing the roof top air conditioner unit.

Nuts are a well-known and reliable solution of providing the stabilizing and/or connecting element.

According to a further embodiment, the at least one stabilizing and/or connecting element has at least one stabilizing protrusion extending transversely to a longitudinal direction of the stabilizing and/or connecting element. In particular, the at least one stabilizing and/or connection element has a t-beam shaped form. In addition thereto or alternatively, the at least one stabilizing and/or connecting element has at least one coupling bore provided therethrough to increase the contact area and the interlocking between the stabilizing and/or connecting element and the corresponding section of the roof top air conditioner unit made of EPP.

Such features allow to improve the coupling between the stabilizing and/or connecting elements and the corresponding section for the roof top air conditioner unit made of EPP.

According to some embodiments, the at least one stabilizing and/or connecting element is made of metal.

Metal, in general, is a well-known material that is easy to process and very robust. Thus, in according to some embodiments, metal depicts one choice as material for the stabilizing and/or connecting elements. However, other materials may be utilized.

According to some embodiments, a method for producing a roof top air conditioner unit for a vehicle, in particular for a recreational vehicle, comprises the steps of
  casting the roof top air conditioner unit at least in part out of expanded polypropylene (EPP) and
  molding at least one stabilizing and/or connecting element of the roof top air conditioner unit into the section of the roof top air conditioner unit made of EPP.

These steps in particular are performed as one production step, i.e. at the same time. The method thus allows to achieve the above-described roof top air conditioner unit and thus the thereto related advantages (see above).

According to some embodiments at least the housing and/or the base pan of the roof top air conditioner unit is at least in part, but optionally completely cast out of EEP, the at least one stabilizing and/or connecting element is provided as nut configured to be engaged with a corresponding fastening means for assembling and/or installing the roof top air conditioner, and/or the at least one stabilizing and/or connecting element is formed from metal.

A method for assembling and/or installing a roof top air conditioner unit or a roof top air conditioner unit produced with a method comprises the step of engaging at least one fastening means of the roof top air conditioner unit with the at least one stabilizing and/or connecting element.

This method results in a configuration for the roof top air conditioner unit having the above-described advantages.

According to some embodiments, a vehicle, in particular a recreational vehicle, comprises a roof top air conditioner unit or a roof top air conditioner unit produced with a method.

Such a vehicle has the above described advantages related to the roof top air conditioner unit.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

A more complete appreciation of the invention and many of the attendant advantages thereof will be readily obtained as the same becomes better understood by reference to the following description when considered in connection with the accompanying drawings, wherein:

FIG. 2 is a front view of the base pan of FIG. 1; and

FIG. 3 is a side view of the base pan of FIGS. 1 and 2.

DETAILED DESCRIPTION

Figure 1:
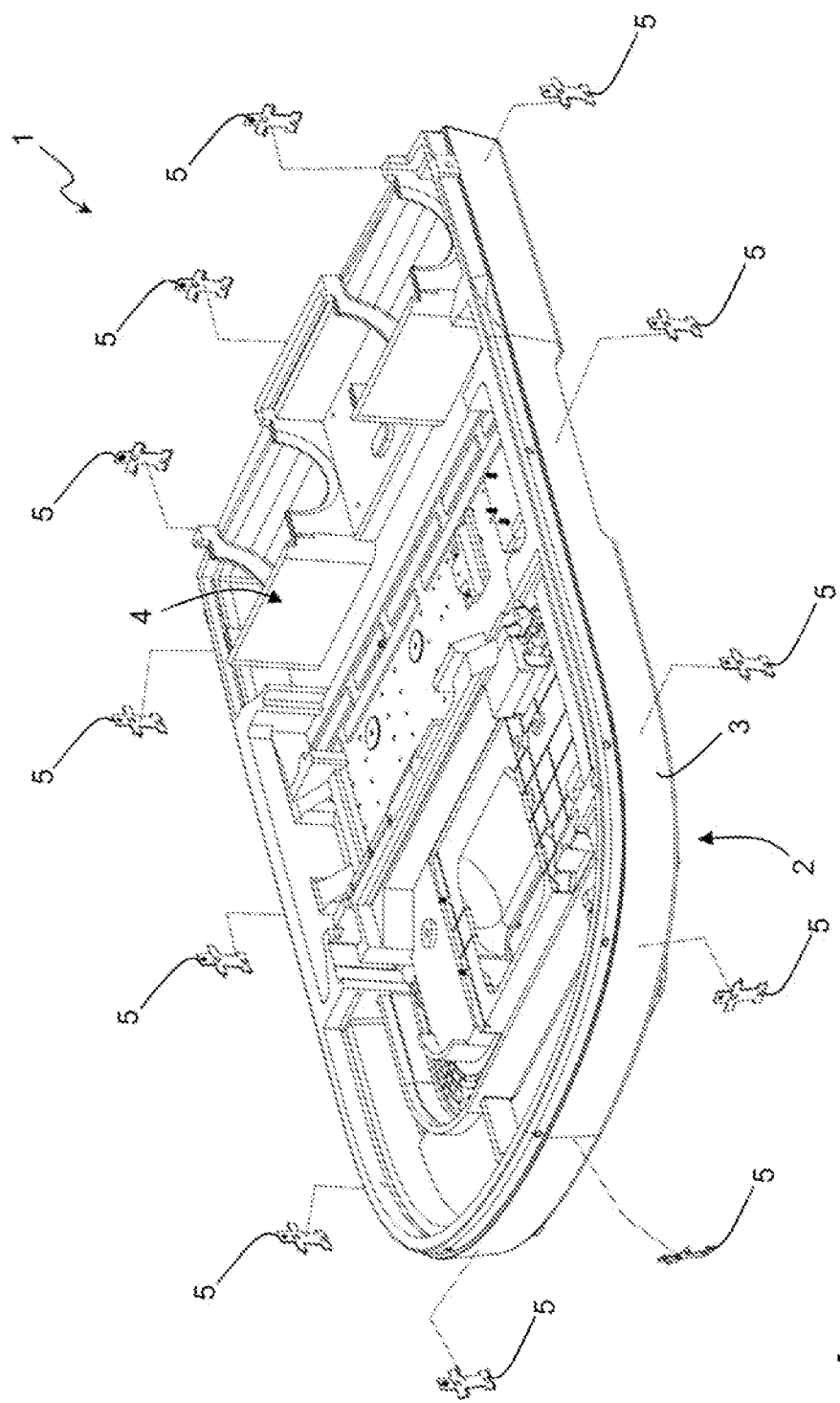
FIG. 1 is an inclined spatial view of a base pan of a roof top air conditioner unit according to an embodiment.

In the following, an exemplary embodiment is described with reference to the accompanying drawings.

In FIG. 1, a base pan 1 of a roof top air conditioner unit and the corresponding stabilizing and/or connecting elements are illustrated.

Besides the base pan 1, the corresponding roof top air conditioner unit has various other elements like the ones of a cooling circuit (not illustrated) and a top housing/cover. However, as the principle structure of roof top air conditioner units is well known and of no specific importance for the present disclosure, for the sake of brevity, only the special technical features will be described in more detail.

The base pan 1 has a base section 2. The base pan 1 further has a frame section 3, the frame section 3 being circumferentially coupled to the base section 2 to form an inner area of the base pan 1. Further, the base pan 1 has a special installation configuration 4 provided on the base section 2. The installation configuration 4 has various different sections for coupling other elements of the roof top air conditioner unit to the base pan 1, dividing the inner area of the base pan 1 in various distinct sections. These sections are provided to accommodate distinct elements of the roof top air conditioner unit, etc.

As the concrete structure of the installation configuration 4 highly depends on the individual setup of the roof top air conditioner unit and is not directly linked to the present embodiments, for the sake of brevity a detailed description of the various illustrated sections of the installation configuration 4 is omitted.

In the illustrated embodiment the whole base pan 1 is made of expanded polypropylene (EPP). Using EPP for the base pan 1 results in a light weight overall configuration. Moreover, EPP is extremely resistant to external environmental influences like humidity or UV-radiation.

As illustrated in FIGS. 2 and 3, the various stabilizing and/or coupling elements 5 are illustrated with doted lines. A plurality of stabilizing and/or coupling elements 5, in the present embodiment in particular 12 (but also other numbers are possible), are mold into the EPP of the base pan 1. By using the stabilizing and/or coupling elements 5 the base pan 1 can be coupled to other elements of the roof top air conditioner unit like the cover thereof.

Here, the stabilizing and/or connecting elements 5 are provided in the technical design of a basically t-beam shaped metal sheet nuts 5 which is mold in the frame section 3 of the base pan 1. Each of the metal sheet nuts 5 has an additional fastening strap 6 with a threaded fixing bore 7 as well as two coupling bores 8a, 8b. As is illustrated in FIG. 2, each threaded fixing bore 7 is aligned with a through hole 9 within the frame section 3 of the base pan 1. Hence, fastening means (not illustrated), like for example screws, can be guided through the through holes 9 an threaded with the threaded fixing bores 7 of the metal sheet nuts 5 in order to couple other elements of the roof top air conditioner unit to the base pan 1 or the base pan 1 to the vehicle.

The t-beam shaped form of the metal sheet nuts 5 and the coupling bores 8a, 8b are provided to increase the contact area between the metal sheet nuts 5 and the frame section 3 of the base pan 1 and thus to strengthen the coupling between them.

Although the illustrated embodiment of the stabilizing and/or connecting elements 5 is one possibility, of course also various other configurations for the stabilizing and/or coupling elements 5 are possible.

For example, the stabilizing and/or connecting elements 5 can be provided solely as stabilizing elements being not configured to be coupled with any further fastening means. Further, the various stabilizing and/or connecting elements 5 can be made of other appropriate material than metall.

Of course, besides the t-shaped form it is possible and within the scope of the present invention to design the stabilizing and/or connecting elements in other forms and shapes including three-dimensional forms.

The illustrated embodiment has been described with reference to the base pan 1 of a roof top air conditioner unit only. However, also any other element of the roof top air conditioner unit can be made of EPP with corresponding stabilizing and/or connecting elements mold therein.

As the method for producing, assembling and installing the roof top air conditioner unit according to the present embodiments can be performed by a skilled artisan, for the sake of brevity no specific description thereof will be given here.

Finally, it is pointed out that a person skilled in the art has many possibilities of adaptation and variation of the above described embodiment according to the present invention, which, however, do not lead away from the core and consequently from the scope of protection.

REFERENCE NUMERALS

1 Base pan
2 base section
3 frame section
4 installation configuration
5 stabilizing and/or connecting elements/metal sheet nut
6 fastening strap
7 fixing bore
8a/8b coupling bore
9 through hole

The invention claimed is:

1. A roof top air conditioner unit, comprising:
the roof top air conditioner unit that at least in part is made of expanded polypropylene (EPP),
wherein the roof top air conditioner unit has a plurality of connecting elements each formed of a material differing from EPP and each molded into a corresponding plurality of locations of the part of the roof top air conditioner unit made of EPP, wherein each of the plurality of connecting elements has a first vertical member that extends longitudinally into the part made of expanded polypropylene (EPP) and a second transverse member extending transversely to the first vertical member, and wherein said second transverse member has a width dimension that is wider than a width of the longitudinally extending first vertical member, wherein each of the plurality of connecting elements partially extends from the part of the roof top air conditioner unit made of EPP, and further comprising a third transverse member that is spaced longitudinally away from said second transverse member.

2. The roof top air conditioner unit of claim 1, wherein the roof top air conditioner unit comprises at least one housing and one base pan.

3. The roof top air conditioner unit of claim 2, wherein the at least one housing or the one base pan is made of EPP.

4. The roof top air conditioner unit of claim 1, wherein each portion of each of said plurality of connecting elements that extends from the part of the roof top air conditioner unit defines a nut for a fastener.

5. The roof top air conditioner unit of claim 1 wherein each connecting element comprises at least one coupling bore which increases interlocking with EPP.

6. The roof top air conditioner unit of claim 1 wherein each of said plurality of connecting elements is formed of metal.

7. A roof top air conditioner unit, comprising:
the roof top air conditioner unit that at least in part is made of expanded polypropylene (EPP),
wherein the roof top air conditioner unit has a plurality of connecting elements each formed of a material differing from EPP and each molded-in about the roof top air conditioner unit made of EPP, wherein each of the plurality of connecting elements has a longitudinal portion extending into the part made of EPP and a first at least one stabilizing protrusion extending transversely to the longitudinal portion and said first at least one stabilizing protrusion has a width dimension that is wider greater than a width of the longitudinal portion, and further comprising a second stabilizing protrusion spaced longitudinally from the first at least one stabilizing protrusion, further wherein each of the plurality of connecting elements partially extends from the part of the roof top air conditioner unit made of EPP for engagement by a fastener.

8. The roof top air conditioner unit of claim 7, wherein the roof top air conditioner unit comprises at least one housing and one base pan, and wherein one of the at least one housing or the one base pan is formed of EPP.

9. A roof top air conditioner unit, comprising:
a housing and a base pan, at least one of said housing or said base pan formed at least partially of expanded polypropylene (EPP), wherein the roof top air conditioner unit has a plurality of connecting elements each formed of a material differing from EPP, each of said plurality of connecting elements molded-in about the roof top air conditioner unit made of EPP, wherein each of the plurality of connecting elements has a first vertical member that extends longitudinally into the housing or the base pan of expanded polypropylene (EPP) and a second transverse member extending transversely to the first vertical member, wherein said second transverse member has a width dimension that is greater than a width of the longitudinally extending portion, and a third transverse member spaced from said second transverse member, wherein the material of the plurality of connecting elements is stronger than the EPP, wherein each of the plurality of connecting elements partially extends from the housing or the base pan made of EPP for engagement by a fastener.

* * * * *